United States Patent
Chen et al.

(10) Patent No.: US 9,923,496 B2
(45) Date of Patent: Mar. 20, 2018

(54) FAULT-TOLERANT CONTROL METHOD FOR POSITION SENSOR OF SWITCHED RELUCTANCE MOTOR

(71) Applicant: China University of Mining and Technology, Xuzhou (CN)

(72) Inventors: Hao Chen, Xuzhou (CN); Guoqiang Han, Xuzhou (CN); He Cheng, Xuzhou (CN); Qianlong Wang, Xuzhou (CN); Qing Wang, Xuzhou (CN); Xing Wang, Xuzhou (CN)

(73) Assignee: China University of Mining and Technology, Xuzhou, Jiangsu (CN)

( * ) Notice: Subject to any disclaimer, the term of this patent is extended or adjusted under 35 U.S.C. 154(b) by 0 days.

(21) Appl. No.: 15/533,878

(22) PCT Filed: Aug. 20, 2015

(86) PCT No.: PCT/CN2015/087607
§ 371 (c)(1),
(2) Date: Jun. 7, 2017

(87) PCT Pub. No.: WO2016/090956
PCT Pub. Date: Jun. 16, 2016

(65) Prior Publication Data
US 2017/0324358 A1    Nov. 9, 2017

(30) Foreign Application Priority Data

Dec. 8, 2014  (CN) .......................... 2014 1 07445779

(51) Int. Cl.
*H02P 25/08*   (2016.01)
*H02P 6/16*   (2016.01)
(52) U.S. Cl.
CPC ..................... *H02P 6/16* (2013.01)

(58) Field of Classification Search
CPC ....................................................... H02P 6/16
(Continued)

(56) References Cited

FOREIGN PATENT DOCUMENTS

| CN | 103414408 A | 11/2013 |
| CN | 103439655 A | 12/2013 |
| CN | 104467566 A | 3/2015 |

OTHER PUBLICATIONS

International Search Report re PCT/CN2015/087607, dated Oct. 19, 2015, 4 pgs.
(Continued)

*Primary Examiner* — Erick Glass
(74) *Attorney, Agent, or Firm* — Greenberg Traurig, LLP

(57) ABSTRACT

A fault-tolerant control method for a position sensor of a switched reluctance motor, if the position sensor of the switched reluctance motor runs without a fault, detecting, in real time, four equal-interval or equal-angle continuous edge pulses of an output signal of the position sensor, the fourth edge pulse being the current edge pulse, and detecting time intervals (T1, T2, T3) between each two adjacent edge pulses sequentially, thereby calculating a time interval (T4) between the current edge pulse and a next edge pulse following the current edge pulse. If the position sensor of the switched reluctance motor fails, and the next edge pulse following the current edge pulse is lost, reconstructing the next edge pulse after the interval time (T4) of the current edge pulse of the output signal of the position sensor. The method can be used, when one or more position sensors of a rotatory and linear switched reluctance motor having various phases and various topology structures fail, to reconstruct an edge pulse after lost.

1 Claim, 2 Drawing Sheets

(58) Field of Classification Search
USPC .................................................... 318/254.1
See application file for complete search history.

(56) References Cited

OTHER PUBLICATIONS

Xu Peilin et al., "Fault Diagnosis and Fault-Tolerant Control Strategy of Position Signals for Switched Reluctance Motors", Proceedings of the CSEE, vol. 31, No. 33, Nov. 25, 2011, pp. 123-129.

FAULT-TOLERANT CONTROL METHOD FOR POSITION SENSOR OF SWITCHED RELUCTANCE MOTOR

FIELD OF THE DISCLOSURE

The present disclosure relates to a method of fault-tolerant control for position sensor of switched reluctance motor, which is especially suitable for fault-tolerant control of position sensor for multiple-phase, multiple-topology, rotary or linear switched reluctance motors.

BACKGROUND

The position sensors that provide a basis of rotor position signals for rotation speed calculation and motor phase change in switched reluctance motor systems may fail owing to some reasons, such as dust and collision, etc., resulting in loss of edge pulses, failure of motor phase change, and failure of normal operation. Therefore, it is very important to reconstruct the output signals of position sensors in a switched reluctance motor system and implement fault-tolerant control of the position sensors. The conventional fault-tolerant control methods for reconstruction of output signals of position sensors haven't taken account of variable speed or variable acceleration/deceleration conditions of the switched reluctance motors. Therefore, the reconstructed output signals of the position sensors have large deviation under variable speed or variable acceleration/deceleration conditions of the motors, affecting the fault-tolerant control effect.

SUMMARY

Technical Problem

To overcome the drawbacks in the prior art, the present disclosure provides a method of fault-tolerant control for position sensor of switched reluctance motor, which is simple, has strong fault-tolerant capability and high reliability, and can attain a good effect.

Technical Scheme

The method of fault-tolerant control for position sensor of switched reluctance motor provided in the present disclosure is as follows:

When the position sensors in a switched reluctance motor operate without fault, four consecutive equal-space or equal-angle edge pulses in the output signals of the position sensors are detected in real time, wherein, the fourth edge pulse is the current edge pulse, and, in a chronological order, the third edge pulse is earlier than the fourth edge pulse, the second edge pulse is earlier than the third edge pulse, and the first edge pulse is earlier than the second edge pulse, the time interval between the first edge pulse and the second edge pulse is $T_1$, the time interval between the second edge pulse and the third edge pulse is $T_2$, and the time interval between the third edge pulse and the fourth edge pulse is $T_3$, and the time interval between the next edge pulse right after the current edge pulse and the current edge pulse is $T_4$, which is calculated according to the following formulas:

$$T_4 = \frac{-B + \sqrt{B^2 - 4AC}}{2A} \quad (1)$$

$$A = \frac{T_1(T_1 + T_2)(T_2 - T_3)^2}{T_3(T_2 + T_3)(T_1 - T_2)} \quad (2)$$

$$B = \frac{T_1(T_1 + T_2)(T_2 - T_3)^2 + T_2(T_2 + T_3)^2(T_1 - T_2)}{(T_2 + T_3)(T_1 - T_2)} \quad (3)$$

$$C = -T_2 T_3 (T_2 + T_3). \quad (4)$$

If a position sensor of the switched reluctance motor fails and the next edge pulse right after the current edge pulse is lost, the next edge pulse is reconstructed at the time interval $T_4$ after the time of the current edge pulse; thus, fault-tolerant operation of the position sensors in the switched reluctance motor is realized.

Beneficial effects: The method provided in the present disclosure is applicable to fault-tolerant control of single position sensor or multiple position sensors in multiple-phase, multiple-topology, rotary or linear switched reluctance motors under constant speed, constant acceleration or deceleration, variable acceleration or deceleration operating conditions. When the position sensors in the switched reluctance motor operates without fault, four consecutive equal-space or equal-angle edge pulses in the output signals of the position sensors are detected in real time, wherein, the fourth edge pulse is the current edge pulse; the time interval between every adjacent two edge pulses is detected successively, and the time interval between the next edge pulse right after the current edge pulse and the current edge pulse is calculated according to the time intervals. If a position sensor in the switched reluctance motor fails and the next edge pulse right after the current edge pulse is lost, the next edge pulse is reconstructed at that time interval after the time of the current edge pulse in the output signal of the position sensor; thus, the switched reluctance motor system can operate in a fault-tolerant manner even when a position sensor fails, and the service life of the system is improved. In the present disclosure, the reconstructed position signal is accurate in time, the algorithm can be implemented simply, and the output signal of a failed position sensor can be reconstructed with the output signal of a position sensor that is operating normally. The method has strong fault-tolerant capability and high reliability, further improves system reliability, and has good application prospects.

DETAILED DESCRIPTION

Hereunder the examples of the present disclosure will be further described with reference to the accompanying drawings:

Example 1

Figure 1:
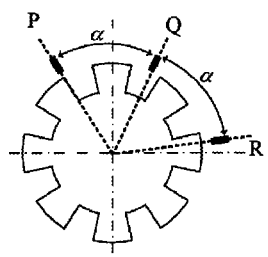
FIG. 1 is an installation diagram of position sensors in a rotary switched reluctance motor in a three-phase 12/8 structure.
Figure 2:
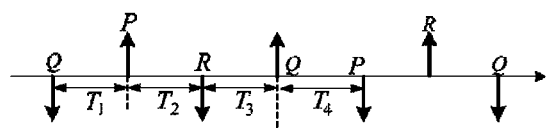
FIG. 2 is a schematic diagram of detection of edge pulses in the output signals and signal reconstruction of position sensors in the rotary switched reluctance motor in a three-phase 12/8 structure.

As shown in the installation diagram in FIG. 1, three position sensors P, Q, R are installed symmetrically in a rotary switched reluctance motor in a three-phase 12/8 structure, and the angular interval α is 60°. When the position sensors in the switched reluctance motor operate without fault, as shown in FIG. 2, four consecutive equal-angle edge pulses Q, P, R, Q in the output signals of the position sensors are detected in real time, wherein, the fourth edge pulse Q counted from the left is the current edge pulse, and, in a chronological order, the third edge pulse R is earlier than the fourth edge pulse Q, the second edge pulse P is earlier than the third edge pulse R, and the first edge pulse Q is earlier than the second edge pulse P, the time interval between the first edge pulse Q and the second edge pulse P is $T_1$, the time interval between the second edge pulse P and the third edge pulse R is $T_2$, and the time interval between the third edge pulse R and the fourth edge pulse Q is $T_3$, the time interval $T_4$ between the next edge pulse P right after the current edge pulse Q and the current edge pulse Q is calculated according to the following formulae:

$$T_4 = \frac{-B + \sqrt{B^2 - 4AC}}{2A} \quad (1)$$

$$A = \frac{T_1(T_1 + T_2)(T_2 - T_3)^2}{T_3(T_2 + T_3)(T_1 - T_2)} \quad (2)$$

$$B = \frac{T_1(T_1 + T_2)(T_2 - T_3)^2 + T_2(T_2 + T_3)^2(T_1 - T_2)}{(T_2 + T_3)(T_1 - T_2)} \quad (3)$$

$$C = -T_2 T_3 (T_2 + T_3); \quad (4)$$

if a position sensor in the switched reluctance motor fails and the next edge pulse P right after the current edge pulse Q is lost, the next edge pulse P is reconstructed at the time interval $T_4$ after the time of the current edge pulse Q; thus, fault-tolerant operation of the position sensors in the rotary switched reluctance motor is realized.

Example 2

Figure 3:
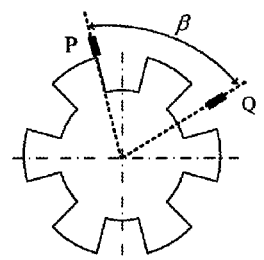
FIG. 3 is an installation diagram of position sensors in a rotary switched reluctance motor in a four-phase 8/6 structure.
Figure 4:
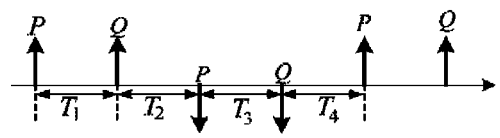
FIG. 4 is a schematic diagram of detection of edge pulses in the output signals and signal reconstruction of position sensors in the rotary switched reluctance motor in a four-phase 8/6 structure.

As shown in FIG. 3, two position sensors P and Q are installed symmetrically in a rotary switched reluctance motor in a four-phase 8/6 structure, and the angular interval β is 75°. When the position sensors in the switched reluctance motor operate without fault, as shown in FIG. 4, four consecutive equal-angle edge pulses P, Q, P, Q in the output signals of the position sensors are detected in real time, wherein, the fourth edge pulse Q counted from the left is the current edge pulse, and, in a chronological order, the third edge pulse P is earlier than the fourth edge pulse Q, the second edge pulse Q is earlier than the third edge pulse P, and the first edge pulse P is earlier than the second edge pulse Q, the time interval between the first edge pulse P and the second edge pulse Q is $T_1$, the time interval between the second edge pulse Q and the third edge pulse P is $T_2$, and the time interval between the third edge pulse P and the fourth edge pulse Q is $T_3$, and the time interval $T_4$ between the next edge pulse P right after the current edge pulse Q and the current edge pulse Q is calculated according to the following formulae:

$$T_4 = \frac{-B + \sqrt{B^2 - 4AC}}{2A} \quad (1)$$

$$A = \frac{T_1(T_1 + T_2)(T_2 - T_3)^2}{T_3(T_2 + T_3)(T_1 - T_2)} \quad (2)$$

$$B = \frac{T_1(T_1 + T_2)(T_2 - T_3)^2 + T_2(T_2 + T_3)^2(T_1 - T_2)}{(T_2 + T_3)(T_1 - T_2)} \quad (3)$$

$$C = -T_2 T_3 (T_2 + T_3); \quad (4)$$

if a position sensor in the switched reluctance motor fails and the next edge pulse P right after the current edge pulse Q is lost, the next edge pulse P is reconstructed at the time interval $T_4$ after the time of the current edge pulse Q; thus, fault-tolerant operation of the position sensors in the rotary switched reluctance motor is realized.

Example 3

Figure 5:
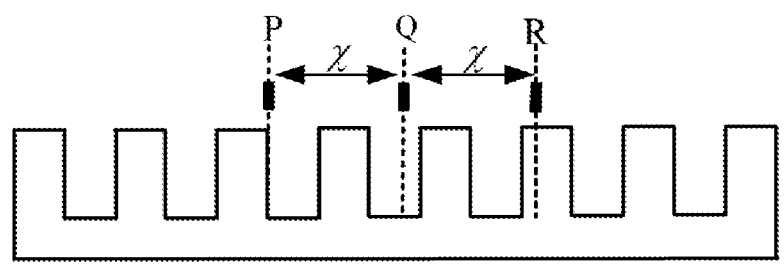
FIG. 5 is an installation diagram of position sensors in a linear switched reluctance motor in a three-phase 6/4 structure.
Figure 6:
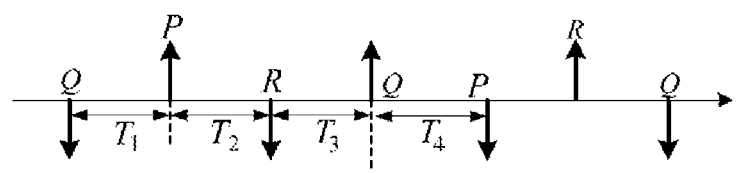
FIG. 6 is a schematic diagram of detection of edge pulses in the output signals and signal reconstruction of position sensors in the linear switched reluctance motor in a three-phase 6/4 structure.

As shown in the schematic installation diagram of FIG. 5, three position sensors P, Q, R are installed symmetrically in a linear switched reluctance motor in a three-phase 6/4 structure, the interval distance x is 30 mm. When the position sensors in the switched reluctance motor operate without fault, as shown in FIG. 6, four consecutive equal-interval edge pulses Q, P, R, Q in the output signals of the position sensors are detected in real time, wherein, the fourth edge pulse Q counted from the left is the current edge pulse, and, in a chronological order, the third edge pulse R is earlier than the fourth edge pulse Q, the second edge pulse P is earlier than the third edge pulse R, and the first edge pulse Q is earlier than the second edge pulse P, the time interval between the first edge pulse Q and the second edge pulse P is $T_1$, the time interval between the second edge pulse P and the third edge pulse R is $T_2$, and the time interval between the third edge pulse R and the fourth edge pulse Q is $T_3$, the time interval $T_4$ between the next edge pulse P right after the current edge pulse Q and the current edge pulse Q is calculated according to the following formulae:

$$T_4 = \frac{-B + \sqrt{B^2 - 4AC}}{2A} \quad (1)$$

$$A = \frac{T_1(T_1 + T_2)(T_2 - T_3)^2}{T_3(T_2 + T_3)(T_1 - T_2)} \quad (2)$$

$$B = \frac{T_1(T_1 + T_2)(T_2 - T_3)^2 + T_2(T_2 + T_3)^2(T_1 - T_2)}{(T_2 + T_3)(T_1 - T_2)} \quad (3)$$

$$C = -T_2 T_3 (T_2 + T_3); \quad (4)$$

if a position sensor in the switched reluctance motor fails and the next edge pulse P right after the current edge pulse Q is lost, the next edge pulse P is reconstructed at the time interval $T_4$ after the time of the current edge pulse Q; thus, fault-tolerant operation of the position sensors in the linear switched reluctance motor is realized.

The method provided in the present disclosure is applicable to fault-tolerant control of single position sensor or multiple position sensors in switched reluctance motors with three position sensors in a three-phase 6/4 structure or three-phase 24/16 structure, switched reluctance motors with four position sensors in a four-phase 8/6 structure or four-phase 16/12 structure, switched reluctance motors with two position sensors in a four-phase 8/6 structure or four-phase 16/12 structure, and rotary or linear switched reluctance motors, etc.

The invention claimed is:

1. A fault-tolerant control method for position sensor of switched reluctance motor, comprising:

when the position sensors in a switched reluctance motor operate without fault, four consecutive equal-space or equal-angle edge pulses in the output signals of the position sensors are detected in real time, wherein, the fourth edge pulse is the current edge pulse, and, in a chronological order, the third edge pulse is earlier than the fourth edge pulse, the second edge pulse is earlier than the third edge pulse, and the first edge pulse is earlier than the second edge pulse, the time interval between the first edge pulse and the second edge pulse is $T_1$, the time interval between the second edge pulse and the third edge pulse is $T_2$, and the time interval between the third edge pulse and the fourth edge pulse is $T_3$, the time interval $T_4$ between the next edge pulse right after the current edge pulse and the current edge pulse is calculated according to the following formula:

$$T_4 = \frac{-B + \sqrt{B^2 - 4AC}}{2A} \quad (1)$$

$$A = \frac{T_1(T_1 + T_2)(T_2 - T_3)^2}{T_3(T_2 + T_3)(T_1 - T_2)} \quad (2)$$

$$B = \frac{T_1(T_1 + T_2)(T_2 - T_3)^2 + T_2(T_2 + T_3)^2(T_1 - T_2)}{(T_2 + T_3)(T_1 - T_2)} \quad (3)$$

$$C = -T_2 T_3 (T_2 + T_3); \quad (4)$$

if a position sensor of the switched reluctance motor fails and the next edge pulse right after the current edge pulse is lost, the next edge pulse is reconstructed at the time interval $T_4$ after the time of the current edge pulse; thus, fault-tolerant operation of the position sensors in the switched reluctance motor is realized.

* * * * *